May 23, 1944. S. C. WATSON 2,349,642
SHAFT COUPLING AND SYSTEM OF POWER TRANSMISSION
Filed Oct. 28, 1941 3 Sheets-Sheet 1

Inventor
Sydney C. Watson
by Parker & Carter
Attorneys.

May 23, 1944.  S. C. WATSON  2,349,642
SHAFT COUPLING AND SYSTEM OF POWER TRANSMISSION
Filed Oct. 28, 1941  3 Sheets-Sheet 2
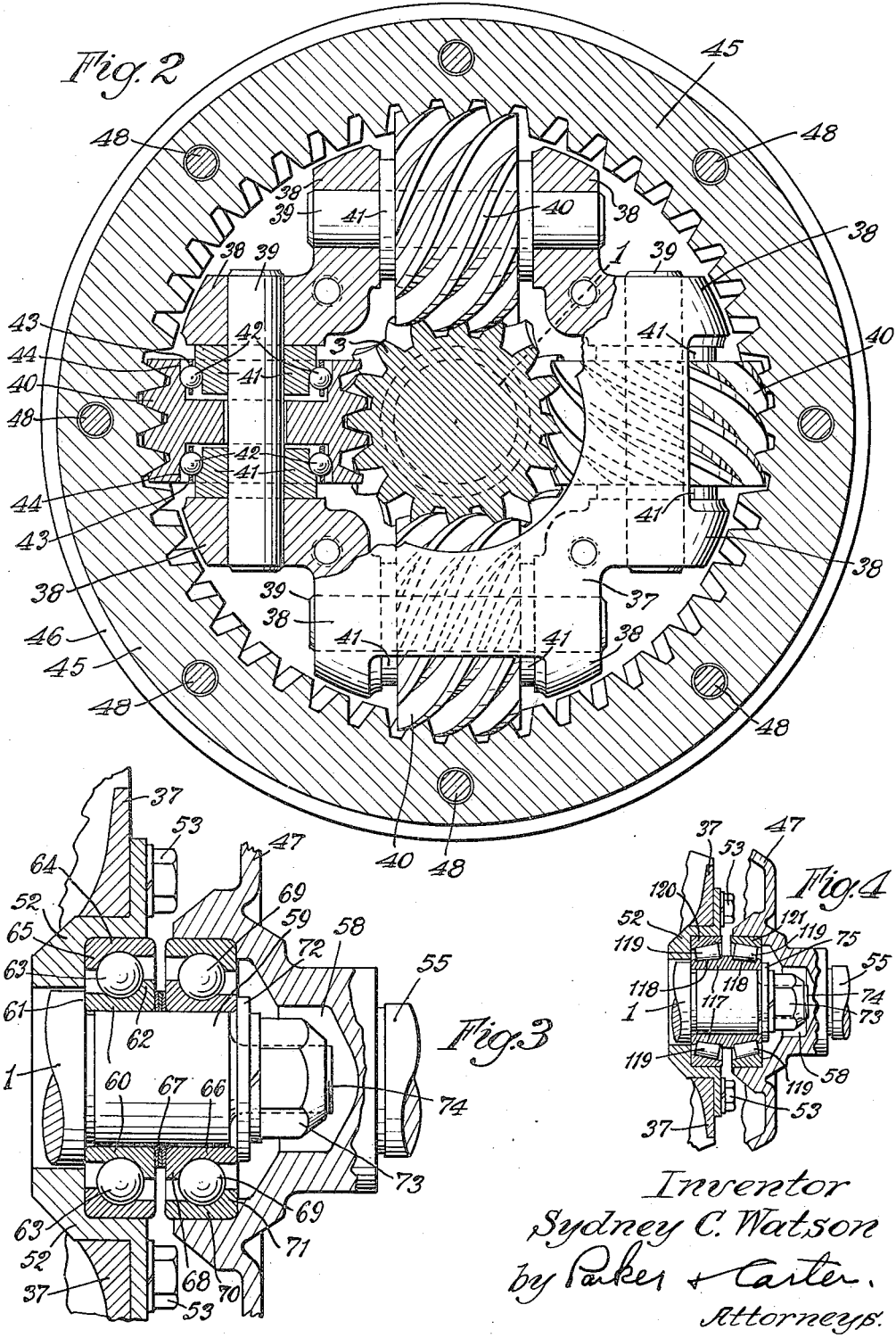
Inventor
Sydney C. Watson
by Parker & Carter.
Attorneys.

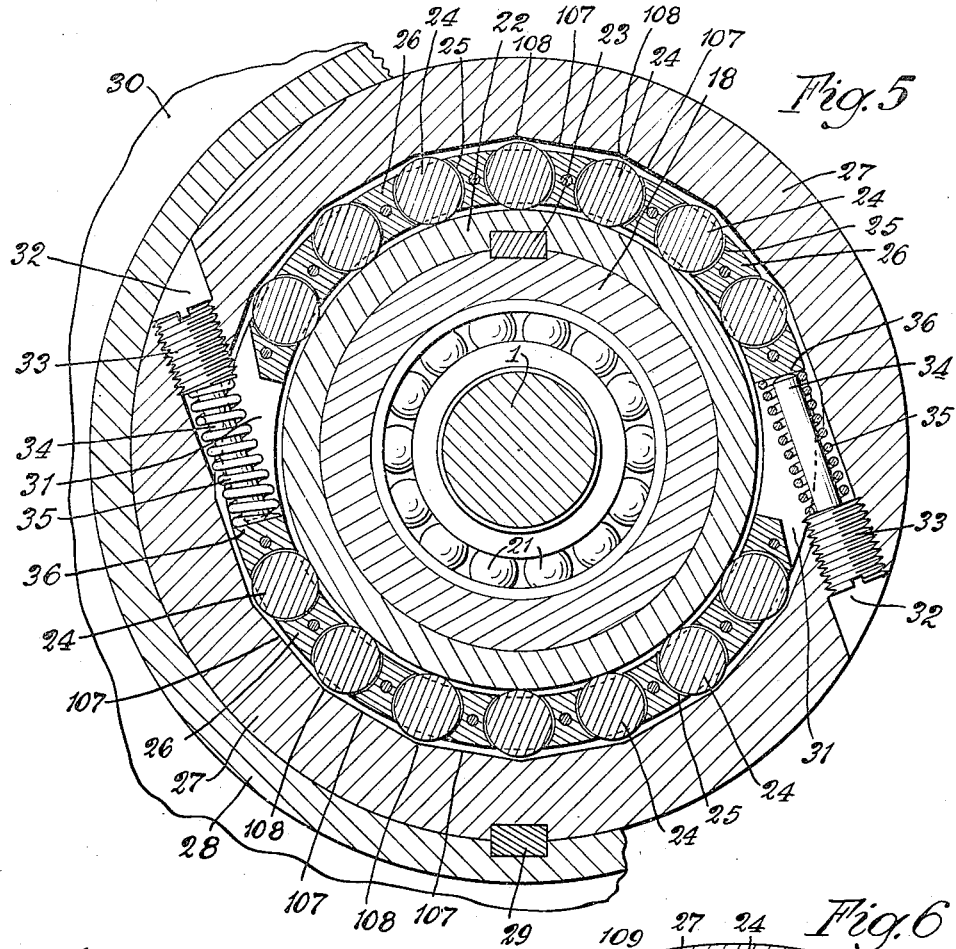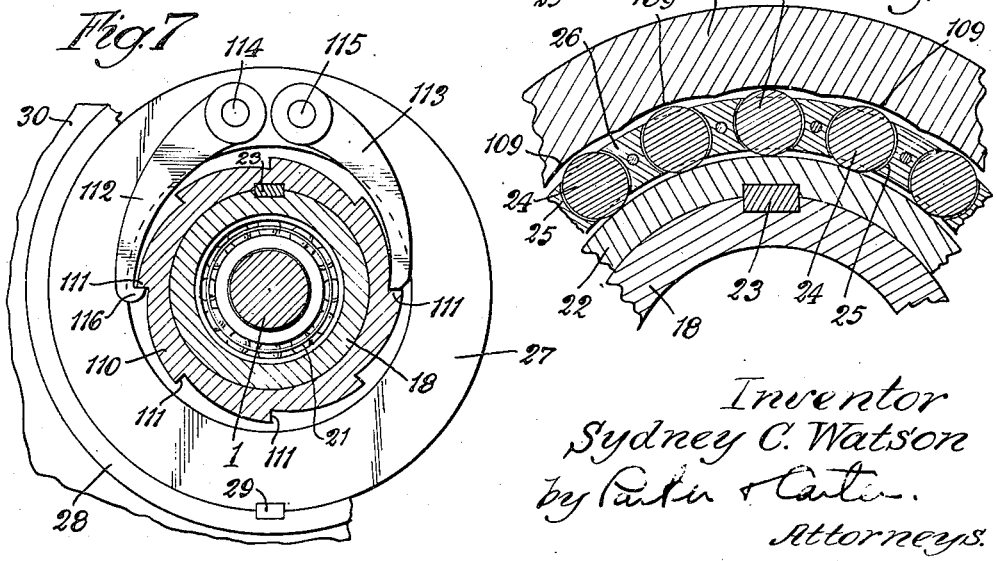

Patented May 23, 1944

2,349,642

UNITED STATES PATENT OFFICE 2,349,642

SHAFT COUPLING AND SYSTEM OF POWER TRANSMISSION

Sydney C. Watson, Chicago, Ill., assignor to Tor-Vel Associates, having as trustees, Sydney C. Watson and Alvin J. Parcelle Application October 28, 1941, Serial No. 416,783

3 Claims. (Cl. 74—189.5)

This invention relates to a shaft coupling and to a system of power transmission. The mechanism and system of this invention may be used as a connection between a prime mover and a machine, vehicle, or other load. An object of the invention is, therefore, to provide a transmission system through which power may be transmitted from a prime mover to some point, device, or mechanism which it is desired to drive. The system is particularly adapted to conditions where a varying torque is required—that is to say, where a torque is required at times which is higher than that available from the prime mover directly. An illustration of this condition is that of the high starting torque required by motor vehicles or the operation of such vehicles in mountainous country, particularly with heavy loads, where the torque requirements vary.

It is another object of this invention, therefore, to provide a coupling means and transmission system which will automatically vary the torque delivered in response to variations in torque demand or load.

In the particular form of the invention here shown, a transmission system for vehicles is illustrated, although it might of course be used for the transmission of power to other work. It is shown as adapted to the use of a friction clutch for use with a non-selfstarting prime mover, such as an internal combustion engine, although the clutch is not a part of the invention, and the invention may be embodied in the device which has no clutch. With a self-starting prime mover such as a steam engine or an electric motor, the initial driven shaft would ordinarily be directly connected without the intervention of a clutch or any other disengaging device, whether mechanical friction, electrical, or of other design.

Another object of the invention is to provide such a torque converting device which operates automatically in response to variations in the torque demand, and which in addition is arranged to provide a positive mechanical drive under certain conditions, the drive comprising a geared reduction means.

Other objects will appear from time to time throughout the specification and claims.

This invention is illustrated more or less diagrammatically in the accompanying drawings, wherein:

Figure 2 is a transverse section taken at line 2—2 of Figure 1;

Figure 3 is a transverse section taken on an enlarged scale at line 3—3 of Figure 1;

Figure 4 is a view on a reduced scale showing the bearing assembly of Figures 1 and 3, illustrating a modified bearing construction;

Figure 5 is a transverse section taken on an enlarged scale at line 5—5 of Figure 1;

Figure 6 is a fragmentary sectional detail illustrating a modified form of clutch mechanism;

Figure 7 is an elevation with parts in section, showing a still further modified clutch means.

Like parts are indicated by like characters throughout the specification and the drawings.

Figure 1:
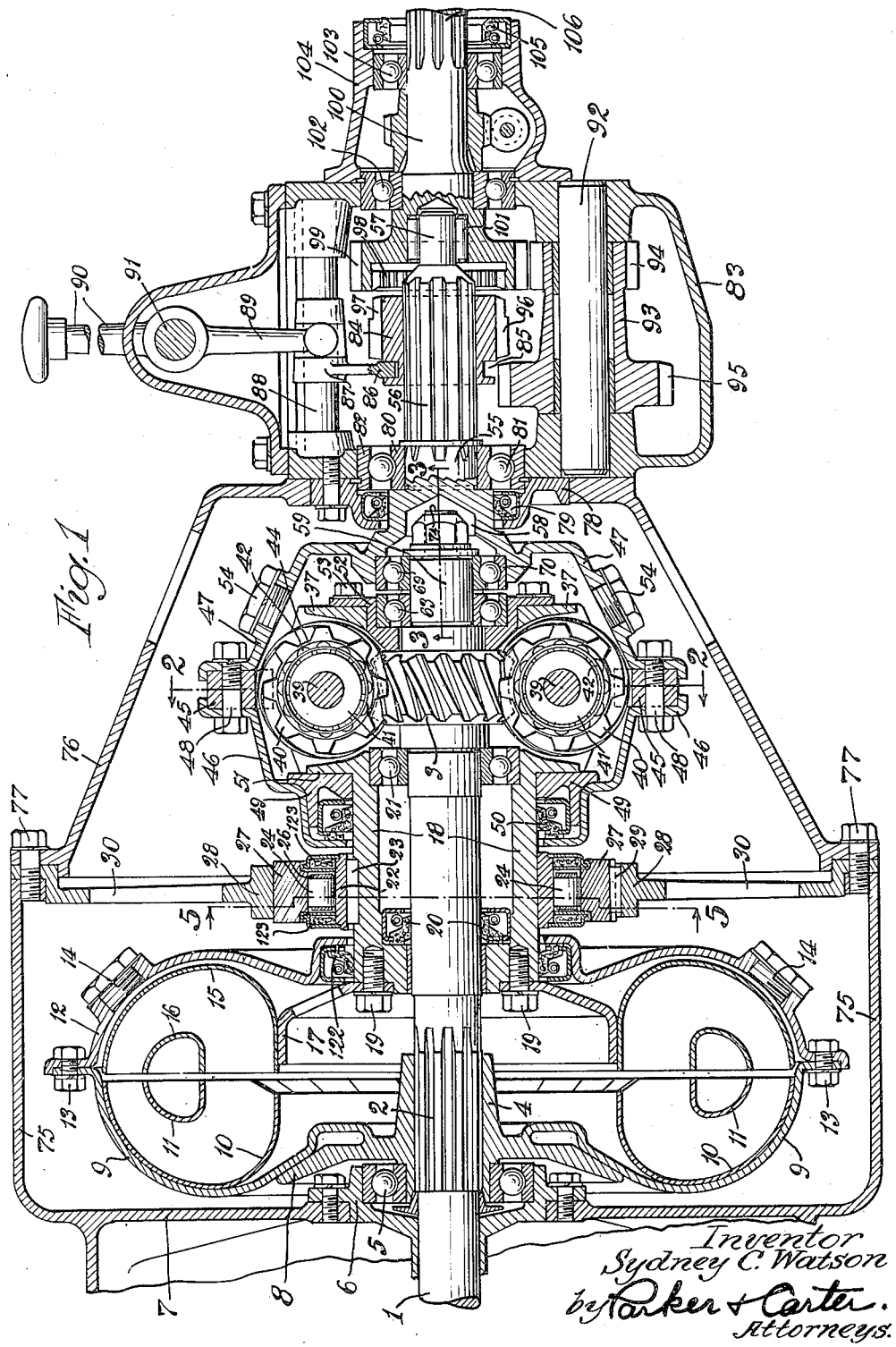
Figure 1 is a longitudinal section through one form of the device, the device being shown in connection with a reverse gear mechanism.

1 is a driving shaft to which power is applied to cause rotation. The shaft may be directly connected to a prime mover or may be connected to a clutch, not shown, since the clutch forms no essential part of the present invention. The shaft 1 is preferably splined, as at 2, and carries an external worm gear 3 which may be formed integrally with it or secured upon it. In the particular form of the invention here shown, the hydraulic coupling of relatively conventional type is used, although the invention is not limited to association with hydraulic coupling. As shown, the coupling includes a hub-like member 4 engaged upon the splines 2 of the shaft 1. This hub is supported for rotation in an anti-friction bearing 5 which is itself supported in member 6. The member 6 is secured to a housing section 7. The hub-like portion 4 is provided with a lateral enlargement 8 and with an additional laterally extending member 9. Fluid passage forming members 10 and 11 are mounted within the member 9. It is to be understood that the details of these coupling members form no essential part of the present invention and that they are substantially well-known in current fluid coupling use and might be very largely varied without departing from the spirit of the present invention.

Secured to the member 9, which is not only a carrying, but a housing member, is a second housing member 12. The members 9 and 12 may be secured together in any desired manner. As shown, they are joined by bolts 13, 13, and the member 12 is provided with filling and emptying openings which are closed by plugs 14. It is to be understood that the coupling is supplied with a liquid and that this liquid is inserted and may be drained through one or another of the openings when one or more of the plugs 14 have been removed. Within the housing member 12 are provided fluid guiding parts 15 and 16. The member 15 is supported at its inner edge by a support 17 which is itself secured to a hub or sleeve 18 by means of screws 19 or otherwise. The shaft 1 may rotate with respect to the hub or sleeve 18 and a sealing assembly 20 is provided to prevent the escape of fluid along the shaft 1.

The other end of the sleeve 18 is positioned upon an anti-friction bearing 21 which supports it with respect to the shaft 1 and permits relative rotation of the two. In the form of the invention illustrated in Figures 1 and 5 there is secured upon the sleeve 18 a roller brake which serves as a "no back" device. While an almost infinite variety of such devices may be used, the one shown in Figure 1 generally and in Figure 5 in detail comprises an inner race 22 which is secured to the sleeve 18 by the member 23. A plurality of rollers 24 is positioned each within a suitable cavity 25 in a cage 26. An outer race 27 is positioned about rotary members 24 and is secured to a frame member 28 by a member 29 or otherwise. The frame member 28 is preferably secured to the frame or housing parts 30. It may be held in any manner and secured to any fixed part. The cage member 26 is provided with one or more cavities 31. These are cut-away portions in which no rotary members 24 are positioned. The outer race 27 is provided with one or more threaded openings 32. In each of these is seated a threaded member 33 which has a rigid extension 34. Each extension 34 projects into one of the cut-away portions 31 of the cage 26, and comprises a stop in a manner which will be described below. About each of the stops 34 is positioned a compression spring 35. This spring bears against an abutment portion 36. There is one such abutment portion formed in each of the cavities 31. A spring bears against each of these portions, and one of the stops may contact each of these portions to limit movement of the cage.

The sleeve 18 is attached to or integral with a carrier 37. The carrier 37 is provided with a pair of arms 38. A shaft 39 is positioned in each pair of arms 38 and upon each shaft is mounted a barrel-shaped worm gear 40. The worm gears may be supported for rotation upon any desired type of bearing. As shown, however, anti-friction bearings are provided and for each barrel-shaped worm gear 40 these bearings include two inner races 41, a plurality of rotary members 42, cages 43, and outer races 44. As shown, these races are formed as a part of or formed in the inner face of each worm gear 40, although, of course, separate and additional outer races might be provided.

Positioned about the carrier 37 and meshing with the worms 40 is an internal worm gear 45. Two housing members 46 and 47, are also positioned about the carrier and worms 40. Adjacent portions of the housings 46 and 47 are secured together and to the worm gear 45 by bolts 48 or otherwise. The inner edge of the housing portion 46 engages a member 49 and is also provided with a sealing assembly 50. The carrier 37, where it joins the sleeve 18, is shaped to provide a shoulder portion 51 against which the member 49 is positioned.

At the end of the sleeve, which is away from the member 49 and the shoulder 51, is secured a bearing supporting ring-like member 52, which is held in place on the carrier by screws 53 or otherwise.

The housing section 47 is provided with one or more openings for filling or emptying, which are closed by removable plugs 54 and at its outer end the housing 47 is provided with an integral shaft portion 55 which is splined at 56 and reduced as at 57. Within this shaft 55 is a cavity 58 into which the end 59 of the shaft 1 penetrates. It is to be noticed that this end is reduced to receive one or more anti-friction thrust bearings. One of these bearings includes an inner race 60 which abuts against a shoulder 61 formed on the shaft 1. This inner race 60 is provided with a raised border 62, this border being on the side of the race away from the shoulder 61. Rotary members 63 are positioned in the bearing in contact with the race 60 and in contact with an outer race 64, which is provided with a raised border 65, this border being opposite to the raised border 62 of the race 60. The outer race 64 is positioned in the collar member 52. Adjacent the bearing just described is a second similar but oppositely placed bearing assembly, and it comprises an inner race 66, positioned upon the reduced portion 59 of the shaft 1, and separated from the race 60 by one or more shims 67 if desired. This inner race 66 is provided with a raised border 68 which is adjacent to the raised border 62 of the race 60. Rotary members 69 are positioned in contact with the race 66 and also in contact with an outer race 70. This outer race is provided with a raised border 71 which is opposite the raised border 68 of the inner race 66. The inner races of both bearings are held in place by a washer 72 and a nut 73 which is removably positioned upon the reduced threaded end 74 of the shaft 1 within the cavity 58.

That portion of the mechanism above described which includes the fluid coupling is positioned within a housing member 75, and that portion which includes the external worm, the internal worm, the carrier, and barrel-shaped worm gears is enclosed within a housing portion 76 which is removably secured to the housing 75 and frame 30 by screws 77 or otherwise. A ring-like member 78 is carried by the housing portion 76 and includes a sealing assembly 79 which is in contact with the exterior of the shaft-like portion 55. This shaft is supported in part by an antifriction bearing assembly which includes an inner race 80 positioned upon the shaft portion 55, a plurality of rotary members 81, and an outer race 82 which is positioned in part upon the ring-like member 78 and is preferably held against rotation with respect to that member.

If desired, a reverse gear assembly may be associated with the device of this invention, and it is so shown in Figure 1. The reverse gear mechanism includes an enclosing and supporting housing 83. If no reverse gear is to be provided, the shaft portion 55 or 56 may be considered as the driven shaft. In the particular form of reverse gear here shown, a pinion 84 is slideably mounted on the splined portion 56 of the shaft 55. It is provided with a groove 85 in which a fork 86 is positioned, slideably mounted on a hub 87 which itself slides on a rod or guide 88 and is arranged to be engaged by the end 89 of a shift lever 90 which is itself pivoted as at 91 for movement.

Positioned within the housing 83 is a countershaft gear assembly which includes a stub shaft 92 and a gear assembly having a body 93 with a smaller gear 94 formed on it and a larger gear 95 formed also on it. The pinion 84 is formed with tooth portions 96 suitable for meshing with the teeth of the gear 95. It is formed also with tooth portions 97 suitable for meshing with the teeth 98 of a gear 99, which is preferably formed as a part of a stub shaft 100. The end 57 of the shaft portion 56 is received in anti-friction bearings 101 which are positioned for rotation within a suitable cavity in a member 99, 100. That member is supported in anti-friction bearings 102 and in anti-friction bearings 103 which are positioned within a housing extension 104. A sealing assembly 105 closes the extension 104. The shaft portion 100 is splined as at 106 for connection to a part which is to be driven. Means not shown are required to drive the gear 94 from the gear 99 when the position of the pinion 84 is such that the gear 99 is driven. Since, however, this is standard practice in reverse gears, this detail has been omitted, as the applicant is making no claim to a reverse gear as such.

Certain modified constructions are shown in the drawings. It will be noticed that in Figure 5 the outer race 27 is formed with a plurality of flat faces 107 which meet to form depressions 108. These points are referred to as depressions because at that point the clearance between the inner race 22 and the outer race 27 is at a maximum.

As shown in Figure 6 the outer race 27, instead of having the flat portions 107 is shaped to provide a plurality of concave portions 109.

As shown in Figure 7, instead of the roller brake of Figures 1, 5 and 6, there is provided a ratchet mechanism in which instead of the race assembly shown in the preceding figures, a ratchet wheel 110 is mounted on the sleeve 18 and forms a plurality of ratchet teeth 111. Gravity latching pawls 112 and 113 are supported respectively upon members 114 and 115. The pawl 112 is provided with a hook portion 116. As shown in Figure 7 the pawls both engage teeth 111 and prevent counter-clockwise rotation of the ratchet and the parts secured to it, while permitting clockwise rotation.

In Figure 4 there is shown a modified form of the bearing construction of Figure 3. Since this bearing has the dual function of supporting a part for rotation and at the same time of providing a thrust bearing, any form of anti-friction thrust bearing may be used, and that shown in Figure 4 comprises rollers instead of balls, and a combined inner race instead of two separate inner races. Thus there is the combined inner race member 117 provided with two oppositely disposed inner race portions 118, 118 upon each of which is positioned a plurality of tapered roller 119, and there are provided two outer races. Thus there is an outer race 120 seated in the member 52 and an oppositely disposed outer race 121 seated in the member 47.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawings to be taken as in a broad sense illustrative or diagrammatic, rather than as limiting me to my precise showing.

In particular many forms of sealing and leak-preventing means may be provided. It is ordinarily necessary to provide means to prevent lubricant or other fluid from escaping from the mechanism as a whole and from leaking from one part of the mechanism to the other. Thus a packing assembly 122 is provided to prevent leakage of fluid from the fluid coupling, and packing and enclosing means 123, 123 are provided about the roller brake to prevent escape of lubricant from it and of course to prevent the entrance of foreign matter to it. The invention is not limited to any particular form of sealing and protecting means.

The use and operation of the invention are as follows:

This device generally, and in particular as shown, is used to transmit power from a source of power to a point where power is required. Ordinarily it is used in connection with a prime mover to rotate some other member. When the device is connected, for example, to a prime mover, which may be an internal combustion engine, a clutch will ordinarily be used, but not necessarily. Assuming now that a driving means is provided and that the shaft 1 is rotated, it follows that the external worm gear is also rotated, because it is positively connected to the driving shaft. When the driving shaft is driven, if the torque requirements on the driven end do not exceed a certain limit, which depends upon the design and proportion of the parts, and particularly of the gears, the external worm gear will carry the barrel-shaped worm gears, the internal gear, and the housing which carries it about bodily so that these parts rotate with the driven shaft and do not have relative movement between themselves. The drive shaft of course rotates with the housing, which carries it.

Should the torque requirements on the driven shaft increase, resistance to rotation of that shaft will of course occur and this resistance tends to hold back the rotation of the internal worm gear. If this tendency is sufficient, the worm drive assembly may no longer rotate as a unit and relative movement of the parts will occur. When that happens the external worm gear continues to rotate, and if the torque requirements are high enough, the barrel-shaped worm gears will be rotated on their individual axes, and this rotation is imparted to the internal worm gear and this gear is driven by the rotation of the barrel shaped worm gears. Of course during this time also the barrel-shaped worm gears exert some axial thrust.

During the operation above described, the fluid coupling is influencing the movement of the carrier in which the barrel-shaped worm gears are mounted. Since the impeller of the coupling is fixed to the driving shaft, it rotates with it and it drives the runner which is fixed to the carrier, and thus the carrier is rotated. Under certain conditions the carrier is rotated as fast as and in the same direction as the driving shaft, and it is under those conditions that the worm gear assembly rotates as a unit without relative movement between its parts. When, however, the torque requirements become sufficient to slow down the movement of the internal worm gear, the carrier will rotate more slowly than does the driven shaft.

No matter what the torque requirements, the carrier can never move in a direction opposite to the direction of rotation of the driven shaft. This is prevented by the roller brake which is arranged to permit movement of the carrier only in the same direction as that of the driving shaft, and should the torque requirements become so great that the carrier will stand still, it will have no reverse rotation. When that condition is reached, the entire driving effect upon the driven shaft is accomplished by a positive worm gear drive. Thus when the carrier is stationary, the external worm gear is rotated positively, since it is fixed to the driving shaft, and it rotates the barrel-shaped worm gears on their individual axes, and they rotate the internal worm gear. During this condition the driving effect imparted by the fluid coupling on the carrier is insufficient to move it.

When the torque requirements become less, the fluid coupling is effective to move the carrier forward, and when that happens the worms are, of course, carried bodily about their orbit as the carrier moves, and they impart a driving effect on the internal worm gear which is in addition to that due to their rotation. As they are carried bodily about their orbit in the carrier they impart an axial thrust which is effective to increase the speed of rotation of the internal worm gear.

When the carrier is stalled and the entire driving effect is through a positive gear train, the reduction in the speed of rotation between the driving and driven shaft is in direct proportion to the ratio of the number of teeth in the external worm driving gear to the number of teeth in the internal worm driven gear, and during this time the torque or turning effort of the system will be multiplied and delivered to the driven shaft. The torque is thus of course increased. From the above it is clear that this system and apparatus increases the torque applied at the input end over the torque delivered at the output end, when the load at the output end requires such torque increase, and this torque increase occurs in automatic response to the torque requirements. Obviously, as the torque requirements fluctuate the apparatus automatically responds to such fluctuation and the variations in operation above described take place.

A typical condition of operation is that in which the mechanism here shown is used in the drive of an automotive vehicle. When the vehicle is started from a stationary condition, the drive shaft moves initially at very low speed. At low speeds or where a high starting torque is required, a fluid coupling is inefficient and the drive to the driven shaft is through the gear train which includes the external worm gear, the barrel-shaped worms, and the internal worm gear, and there are different times when the carrier or re-action member is held stationary, and a corresponding multiplication of torque from the driving to the driven shaft occurs. As the rotative speed of the driving shaft and the impeller of the fluid coupling increases and the load on the driven or output end decreases, the tendency above pointed out for the runner of the fluid coupling to commence rotation is increased, and when the runner is free to move and does so, it moves the carrier and carries the barrel-shaped worms in their orbit in the same direction as that in which the driving shaft is being rotated. As the load on the output end or driven shaft decreases to the turning effort available at the input end or driving shaft, the tendency above discussed for the entire system to lock itself up as a single unit and to rotate without individual relative movement between the parts develops and a direct drive accomplished.

It has been found in actual practice when using the type of gear train shown that when the maximum torque increase resulting from the complete stoppage of the carrier member is not required, if the rotative speed of the driven member is maintained above a certain low point which depends on the design and proportion of the parts which make up the unit, that the operation of this gear train will adapt itself to torque requirements and provide an increase in torque varying between a point of 1 to 1 direct drive with no increase in torque, and a maximum increase in torque which results from the complete stoppage of the carrier or re-action member. Thus the transmission mechanism and system here shown provide automatic means for multiplying the torque available in a prime mover into a positive maximum higher torque which depends on the design and proportion of the parts which make up the apparatus. At the same time it provides means for the decrease in the reduction of rotative speed between the driving and driven shaft and for bringing the driving and driven shafts up to the same rotative speed automatically without the intervention of any gear shifting or equivalent device whatever.

The mechanism which has been called a roller brake is obviously a "no back" device arranged to prevent rotation of the carrier in a direction opposite to that in which the driving shaft is rotated. Obviously this shaft may be rotated in either direction, depending upon the details of the mechanism. Whatever the direction of rotation of the driving shaft is, the "no back" device is arranged to prevent reverse rotation of the carrier.

A very large variety of "no back" devices, brakes or one-way clutch means is known in the art, and this invention is not limited to any particular one-way clutch, brake or the like and the purposes of the invention will be served by almost any type of one-way clutch or brake which while permitting rotation in one direction prevents it in the other. The particular means herewith shown are, therefore, to be considered as merely examples of possible clutch or brake means.

The one-way brake or "no-back" device shown differs somewhat from those of the prior art. Such one-way clutches or brakes usually consist of three essential units: the outer race, the inner race, and the roller assembly. In the form shown in Figures 1 and 5, since in ordinary use rotation of the carrier will be the general condition, and the no-back or locked position will be used relatively infrequently, it is preferable not to have the roller assembly rotate with the shaft. Therefore, the inner race comprises a concentric shaft-like surface member and rotates, of course, with the driven shaft 1 while the outer race becomes the cam member. This is opposite to the construction usually found in one-way brakes as now known. The outer race may have cam surfaces of any desired shape. In Figure 5 they are shown as a series of flat surfaces, and in Figure 6 as a series of concave surfaces. The flat surfaces of Figure 5 are formed on tangents on a circle concentric with the axis. The smaller or reduced space between these flats and the outer diameter of the inner race is smaller than the diameter of the rollers or other rotary members and permits a locking or wedging action when the rollers are rotated in one direction by the reverse motion of the shaft.

The screws, pins, or studs which include the portions 33 and 34 serve a dual purpose. The inner ends of the studs form an abutment to prevent the roller assembly from rotating too far forward, and thereby they prevent the rollers from locking in both directions of rotation. They are arranged to permit the clutch or brake to lock only in one direction. This direction is determined by the initial assembly of the parts. The second purpose of the pins or studs is to furnish an abutment or guide for the springs which are positioned tangentially between the outer cam member and a radial surface approximately in the center of the roller cage or carrier. These compression springs exert a pressure which tends to rotate the roller assembly into the locked position, and thus causes an almost instantaneous engagement on the occurrence of reversal of rotation of the inner race and thus these springs assist the rotary members to effect an almost instantaneous locking and to prevent reverse rotation.

The operation of the form of Figure 6 is substantially the same as that just described, the difference being merely in the shape of the cam faces.

The form of Figure 7 operates as a ratchet and has the same general effect to prevent reverse rotation.

The bearings which are shown generally in Figure 1 adjacent the right-hand end of the shaft 1 are shown in greater detail in Figure 3 and in modified form in Figure 4. These are combined thrust and anti-friction bearings. When the inclination of the external worm gear is as shown in Figure 1, it tends to carry the worms to the right from the position shown in Figure 1, and thus it sets up a right-hand thrust on the worms and on the carrier in which they are mounted. Conversely the worms themselves set up a left-hand thrust on the internal worm gear 45 and there are thus two oppositely directed end thrusts created by the construction shown. The bearings are arranged to receive these thrusts. Thus the bearing formed of the races 60 and 64 receives and supports the right-hand thrust of the worms, and their carrier, while the bearings formed of the races 66 and 70 receive and support the left-hand thrust which is imparted to the internal worm gear 45 and carried through the housing member 47 to the outer race 70. As shown in Figure 3, each of the bearings just discussed is provided with raised margins to receive and support the thrusts mentioned. In the inner or left-hand bearing these margins comprise the members 62 and 65, and in the outer or right-hand bearing these margins comprise the members 68 and 71. The positioning of the raised margins on the races of these bearing is determined, of course, by the directions of the thrusts which are set up. In the modified form of Figure 4 the inner races are formed on a unitary member. The form of Figure 3 could, of course, be made with a unitary inner member having shaped on it two race portions. While the thrust bearings above described might be positioned elsewhere on the shaft, it is a convenience in construction and assembly to carry them where they are, and this positioning has the further important advantage that the bearings are positioned upon a portion of the shaft 1 which is not carrying a tortional strain. The portion of the shaft 1 to the left of the external worm gear 3 transmits rotation and is under tortional strain, but the portion of the shaft to the right of worm gear 3 transmits no power and is not under strain. The location of the thrust bearings at this point, therefore, permits a reduction in the size of the shaft at that point.

An end thrust is set up upon the runner formed of the members 15 and 16, and this end thrust must be carried by a suitable bearing. Since the thrust is transmitted to the sleeve 18 and thence to the carrier, it is taken up by the bearing which includes the runners 60 and 64, and this bearing thus serves the triple purpose of furnishing an anti-friction bearing for the shaft 1, of taking up end thrust of the carrier and the worms, and of taking up end thrust of the runner of the hydraulic coupling.

In considering the general operation of the device, and particularly the operation of the worms in their relation to the two worm gears with which they mesh, it is to be recognized that when driving under load there are, of course, pressures exerted between the threads of the worms and the teeth of the internal worm gear, and there is thus an effort required to slide the threads of the worms past or along the teeth of the worm gears. This effect itself under certain circumstances tends to lock the worms to the internal worm gear, and as the load on the internal worm gear is not greater than the effort available in the external worm gear, then the external gear, the carrier, the worms, and the internal gear will revolve as a unit, as it takes less effort to do this than it does to rotate the worms about their individual axes and to slide the worm threads past the teeth of the internal worm gear. In most mechanisms this characteristic, which may be considered friction, would be a detriment, but in the present mechanism advantage is taken of this very characteristic to accomplish efficient operation. There is a reluctance of the barrel-sharped worm gears to rotate about their own axes due to the tooth pressure of the threads of the worms on the teeth of the internal worm gear when under load.

I claim:

1. In combination, an internal worm gear drive and fluid coupling therefor, a driving shaft, an impeller fixed on said shaft, a member rotatable about said shaft, a runner fixed on said member and opposed to said impeller, a driven shaft, an internal worm gear fixed in relation to said gear housing, a carrier fixed to said member within said gear housing and surrounding said driving shaft, means for preventing rotation of said carrier in a direction opposite to that in which said driving shaft is rotated, and a combined anti-friction thrust bearing positioned on the side of said carrier away from said fluid coupling, and upon the terminal end of said driving shaft, a plurality of worms positioned for rotation in said carrier and in mesh with said internal worm gear, and an external worm gear fixed on said driving shaft and in mesh with said worms.

2. In combination, an internal worm gear drive and fluid coupling therefor, a driving shaft, an impeller fixed on said shaft, a member rotatable about said shaft, a runner fixed on said member and opposed to said impeller, a driven shaft, a gear housing fixed in relation to said gear housing, a carrier fixed to said member within said gear housing and surrounding said driving shaft, means for preventing rotation of said carrier in a direction opposite to that in which said driving shaft is rotated, said means adapted to free said carrier for rotation in the direction in which said drive shaft is driven and in excess to the speed of rotation of said drive shaft, and a multiple number of combined anti-friction thrust bearings positioned on the terminal end of said driving shaft and upon the side of said carrier away from said fluid coupling, a plurality of worms positioned for rotation in said carrier and in mesh with said internal worm gear, and an external worm gear fixed on said driving shaft and in mesh with said worms.

3. In combination, an internal worm gear drive and fluid coupling therefor, a driving shaft, an impeller fixed on said shaft, a member rotatable about said shaft, a runner fixed on said member and opposed to said impeller, a driven shaft, a gear housing fixed in relation to said driven shaft, an internal worm gear fixed in relation to said gear housing, a carrier fixed to said member within said gear housing and surrounding said driving shaft, means for preventing rotation of said carrier in a direction opposite to that in which said driving shaft is rotated, and a multiple number of combined anti-friction thrust bearings positioned on the terminal end of said driving shaft and upon the side of said carrier away from said fluid coupling, one of said combined bearings acting on said carrier, and another of said combined bearings acting on said internal gear.

SYDNEY C. WATSON.